US010893343B2

(12) United States Patent
Barad et al.

(10) Patent No.: US 10,893,343 B2
(45) Date of Patent: Jan. 12, 2021

(54) NODE FOR AN OPTICAL NETWORK

(71) Applicant: AIRBUS OPERATIONS LIMITED, Bristol (GB)

(72) Inventors: Kayvon Barad, Bristol (GB); Alessio Cipullo, Bristol (GB)

(73) Assignee: Airbus Operations Limited, Bristol (GB)

(*) Notice: Subject to any disclaimer, the term of this patent is extended or adjusted under 35 U.S.C. 154(b) by 0 days.

(21) Appl. No.: 16/806,396

(22) Filed: Mar. 2, 2020

(65) Prior Publication Data

US 2020/0236447 A1 Jul. 23, 2020

Related U.S. Application Data

(62) Division of application No. 15/491,108, filed on Apr. 19, 2017, now Pat. No. 10,582,278.

(30) Foreign Application Priority Data

Apr. 19, 2016 (GB) .................................. 1606821.5

(51) Int. Cl.
*H04J 14/00* (2006.01)
*H04Q 11/00* (2006.01)
*H04B 10/07* (2013.01)
*H04J 14/02* (2006.01)

(52) U.S. Cl.
CPC ......... *H04Q 11/0005* (2013.01); *H04B 10/07* (2013.01); *H04J 14/00* (2013.01); *H04J 14/0201* (2013.01); *H04Q 2011/0009* (2013.01); *H04Q 2011/0035* (2013.01)

(58) Field of Classification Search
CPC ....... H04Q 11/0005; H04Q 2011/0035; H04Q 2011/0009; H04J 14/00; H04J 14/0201; H04J 14/0213; H04J 14/0212; H04J 14/02; H04J 14/0283; H04B 10/07; G02B 7/006; G02B 6/02209
USPC .................................................... 398/43–103
See application file for complete search history.

(56) References Cited

U.S. PATENT DOCUMENTS

| 5,557,439 A | 9/1996 | Alexander et al. |
| 5,706,375 A | 1/1998 | Mihailov |
| 5,751,456 A | 5/1998 | Koonen |
| 5,778,118 A | 7/1998 | Sridhar |
| 5,822,095 A | 10/1998 | Taga |
| 5,841,918 A | 11/1998 | Li |
| 5,926,300 A | 7/1999 | Miyakawa |

(Continued)

*Primary Examiner* — Dibson J Sanchez
(74) *Attorney, Agent, or Firm* — Nixon & Vanderhye P.C.

(57) ABSTRACT

An optical network including an input to receive from an optical network light comprising plural wavelength components. An optical wavelength selective filter, optically connected to the input, extracts a first wavelength component of the plural wavelength components from the light, thereby providing a first optical signal including the first wavelength component and a second optical signal including a remainder of the plural wavelength components a light emitter to provide a modulated broadband optical signal. A first output, optically connected to the optical wavelength selective filter, receives a first portion of the second optical signal for transmission to a light detector and a second output, optically connected to optical wavelength selective filter, receives a second portion of the second optical signal for transmission to the optical network.

10 Claims, 7 Drawing Sheets

(56) References Cited

U.S. PATENT DOCUMENTS

| | | |
|---|---|---|
| 5,946,430 A * | 8/1999 | Morrow ............... G02B 6/2932 385/10 |
| 5,953,141 A * | 9/1999 | Liu ..................... H04J 14/0206 385/24 |
| 5,953,470 A | 9/1999 | Toyohara |
| 5,982,518 A | 11/1999 | Mizrahi |
| 6,040,932 A | 3/2000 | Duck |
| 6,041,152 A | 3/2000 | Clark |
| 6,061,484 A * | 5/2000 | Jones ................... G02B 6/2932 385/24 |
| 6,069,719 A | 5/2000 | Mizrahi |
| 6,122,095 A * | 9/2000 | Fatehi .................. G02B 6/2932 359/337 |
| 6,122,096 A | 9/2000 | Fatehi |
| 6,130,765 A | 10/2000 | Gautheron |
| 6,144,784 A | 11/2000 | Shigehara |
| 6,173,093 B1 | 1/2001 | Jeal |
| 6,205,269 B1 | 3/2001 | Morton |
| 6,243,179 B1 * | 6/2001 | Thompson .......... H04J 14/0213 398/9 |
| 6,266,460 B1 | 7/2001 | Doerr |
| 6,288,812 B1 | 9/2001 | Duerksen |
| 6,331,908 B1 | 12/2001 | Adams |
| 6,377,372 B1 | 4/2002 | Yanagi |
| 6,415,074 B1 | 7/2002 | Donald |
| 6,449,072 B1 | 9/2002 | Sian |
| 6,519,064 B1 | 2/2003 | Fatehi |
| 6,535,309 B1 * | 3/2003 | Terahara ............... G02B 6/2932 398/79 |
| 6,546,167 B1 | 4/2003 | Chen |
| 6,587,237 B1 * | 7/2003 | Shi ..................... H04J 14/0226 385/24 |
| 6,631,245 B1 | 10/2003 | Bendelli |
| 6,751,375 B1 | 6/2004 | Meyer |
| 6,754,403 B1 * | 6/2004 | Schmid ................ G02F 1/125 359/285 |
| 6,795,610 B1 * | 9/2004 | Meyer ................. G02B 6/29322 385/27 |
| 6,807,373 B1 | 10/2004 | Toullier |
| 6,836,621 B1 * | 12/2004 | Bendelli ............. G02B 6/29322 385/15 |
| 7,058,256 B1 | 6/2006 | Stoll |
| 7,068,940 B1 * | 6/2006 | Woodward .......... H04J 14/0201 398/83 |
| 7,127,169 B1 | 10/2006 | Liu |
| 7,184,666 B1 | 2/2007 | Li et al. |
| 7,221,821 B2 * | 5/2007 | Eldada ................ G02B 6/12007 385/24 |
| 7,228,021 B2 | 6/2007 | Jung |
| 7,266,299 B1 | 9/2007 | Bock |
| 7,433,601 B2 | 10/2008 | Kai |
| 8,571,409 B1 | 10/2013 | Wang |
| 10,044,462 B2 | 8/2018 | De Valicourt |
| 2001/0030786 A1 | 10/2001 | Takahashi |
| 2001/0051019 A1 | 12/2001 | Bailey |
| 2002/0015199 A1 | 2/2002 | Eder |
| 2002/0039213 A1 | 4/2002 | Duerksen |
| 2002/0054406 A1 | 5/2002 | Duerksen |
| 2002/0071156 A1 | 6/2002 | Tervonen et al. |
| 2002/0075537 A1 | 6/2002 | Amin |
| 2002/0110314 A1 | 8/2002 | Connolly |
| 2002/0131689 A1 * | 9/2002 | Feuer ................. H04Q 11/0005 385/24 |
| 2002/0149819 A1 | 10/2002 | Sato |
| 2002/0186431 A1 | 12/2002 | Bisson |
| 2003/0035628 A1 | 2/2003 | Putnam |
| 2003/0053163 A1 * | 3/2003 | Li ....................... H04J 14/0221 398/5 |
| 2003/0072053 A1 | 4/2003 | Weaver |
| 2003/0128917 A1 | 7/2003 | Turpin |
| 2004/0008930 A1 | 1/2004 | Kelly |
| 2004/0028323 A1 | 2/2004 | Bennett et al. |
| 2004/0047373 A1 | 3/2004 | De Zhong |
| 2004/0208580 A1 * | 10/2004 | Zhao ................... H04J 14/021 398/84 |
| 2004/0213575 A1 | 10/2004 | Aono |
| 2004/0218926 A1 | 11/2004 | Kim |
| 2004/0234266 A1 * | 11/2004 | Kim .................... H04J 14/0212 398/83 |
| 2005/0008370 A1 | 1/2005 | Kim |
| 2005/0105844 A1 | 5/2005 | Katsuyama et al. |
| 2006/0045416 A1 * | 3/2006 | Lee .................... G02B 6/29394 385/24 |
| 2006/0115210 A1 | 6/2006 | Nakagawa |
| 2006/0216030 A1 | 9/2006 | Kim |
| 2006/0239684 A1 * | 10/2006 | Oguma ............... H04J 14/0205 398/83 |
| 2007/0269211 A1 | 11/2007 | Doerr |
| 2007/0286605 A1 | 12/2007 | Feuer |
| 2010/0239246 A1 | 9/2010 | Taylor |
| 2010/0260500 A1 | 10/2010 | Ji |
| 2011/0273657 A1 * | 11/2011 | Collings .................. G02F 1/31 349/187 |
| 2013/0084067 A1 | 4/2013 | Iwamura |
| 2015/0381302 A1 | 12/2015 | Brenot |
| 2017/0123236 A1 | 5/2017 | Barad |
| 2017/0303018 A1 | 10/2017 | Barad |
| 2018/0149498 A1 | 5/2018 | Cipullo |

\* cited by examiner

NODE FOR AN OPTICAL NETWORK

RELATED APPLICATIONS

This application is a divisional application of U.S. patent application Ser. No. 15/491,108 (U.S. Pat. No. 10,582,278), filed Apr. 19, 2017, which claims priority to GB 1606821-5 filed on Apr. 19, 2016, the entire contents of each of which are incorporated by reference.

TECHNICAL FIELD

The present invention relates to nodes for optical networks, systems comprising such nodes, optical networks comprising such nodes, and to methods of operating the same.

BACKGROUND

In many communications applications, such as avionics networks, it is desirable to use optical signals to communicate signals between nodes of the network. Optical communications may provide a lighter alternative to electronic communications, may provide higher resistance to electromagnetic interference (EMI) and background noise, and may provide higher communication speeds.

Some communications networks may use wavelength division multiplexing (WDM) whereby different nodes of the network are allocated different wavelengths at which they transmit optical signals. In some applications, different nodes may transmit signals at different frequencies along the same optical communications path, such as a common optical fibre.

In some critical applications, such as aircraft avionics networks, each type of node that is to be used in the network must pass rigorous testing. Such testing may involve significant costs and so it may be desirable to reduce the number of types of node that must undergo such testing.

Furthermore, in some network topologies it is desirable for signals transmitted by a node to be removed from the network when the signals are no longer required. Such removal can be computationally intensive and may require active optical devices that can be complex and costly to test, and may lead to latency as data is read and retransmitted from one node to another.

SUMMARY

A first aspect of the present invention provides a node for an optical network, the node comprising: an input to receive from an optical network light comprising plural wavelength components; an optical wavelength selective filter, optically connected to the input, to extract a first wavelength component of the plural wavelength components from the light, thereby providing a first optical signal comprising the first wavelength component and a second optical signal comprising a remainder of the plural wavelength components; a first output optically connected to the optical wavelength selective filter to receive a first portion of the second optical signal for transmission to a light detector; and a second output optically connected to optical wavelength selective filter to receive a second portion of the second optical signal for transmission to the optical network.

Optionally, the node comprises one or more optical connectors to connect the node to an avionics unit, the one or more optical connectors comprising: a first optical interface, optically connected to the second output, to receive an optical signal from the avionics unit; a second optical interface, optically connected to the first output, to transmit the first portion of the second optical signal to the avionics unit; and a third optical interface, optically connected to the optical wavelength selective filter, to transmit the first optical signal to the avionics unit.

Optionally, the node comprises a first optical circulator, a second optical circulator, and a beam splitter, wherein the first and second optical circulators each comprise a first port, a second port, and a third port, and the first optical wavelength selective filter comprises a first port and a second port, wherein: the first port of the first optical circulator is optically connected to the first optical interface, the second port of the first optical circulator is optically connected to the first port of the first optical wavelength selective filter, and the third port of the first optical circulator is optically connected to the output via the beam splitter; the first port of the second optical circulator is optically connected to the input, the second port of the second optical circulator is optically connected to the second port of the first optical wavelength selective filter, and the third port of the second optical circulator is optically connected to the third optical interface; wherein the beam splitter is arranged to receive light from the third port of the first optical circulator and transmit light to the output and to the second optical interface.

Optionally, the node comprises a first optical circulator, a second optical circulator, a third optical circulator and a beam splitter, wherein the first and third optical circulators each comprise a first port, a second port, and a third port, the second optical circulator comprises a first port, a second port, a third port and a fourth port, and the first optical wavelength selective filter comprises a first port and a second port, wherein: the first port of the first optical circulator is optically connected to the first optical interface, the second port of the first optical circulator is optically connected to the first port of the first optical wavelength selective filter, and the third port of the first optical circulator is optically connected to the first port of the second optical circulator; the second port of the second optical circulator is optically connected to the first port of the third optical circulator, the third port of the second optical circulator is optically connected to optically connected to the second port of the first optical wavelength selective filter, and the fourth port of the second optical circulator is optically connected to the third optical interface; the second port of the third optical circulator is optically connected to the output via the beam splitter and the third port of the third optical circulator is optically connected to the input; wherein the beam splitter is arranged to receive light from the second port of the third optical circulator and transmit light to the output and to the second optical interface.

Optionally, the second optical circulator is optically connected to the third optical circulator via a removable connector.

Optionally, the removable connector is an expanded beam connector.

Optionally, the node comprises a first optical circulator, a second optical circulator, a third optical circulator and a beam splitter, wherein the first and third optical circulators each comprise a first port, a second port, and a third port, the second optical circulator comprises a first port, a second port, a third port and a fourth port, and the optical wavelength selective filter comprises a first port and a second port, wherein: the first port of the first optical circulator is optically connected to the first optical interface, the second port of the first optical circulator is optically connected to the first port of the first optical wavelength selective filter, and the third port of the first optical circulator is optically connected to the first port of the second optical circulator via the beam splitter; the second port of the second optical circulator is optically connected to the first port of the third optical circulator, the third port of the second optical circulator is optically connected to optically connected to the second port of the first optical wavelength selective filter, and the fourth port of the second optical circulator is optically connected to the third optical interface; the second port of the third optical circulator is optically connected to the output and the third port of the third optical circulator is optically connected to the input; wherein the beam splitter is arranged to receive light from the third port of the first optical circulator and transmit light to the first port of the second optical circulator and to the second optical interface.

Optionally, the node comprises a first optical circulator, a second optical circulator, a first beam splitter and a second beam splitter, wherein the first and third optical circulators each comprise a first port, a second port, and a third port, the second optical circulator comprises a first port, a second port, a third port and a fourth port, and the optical wavelength selective filter comprises a first port and a second port, wherein:

the first port of the first optical circulator is optically connected to the input, the second port of the first optical circulator is optically connected to the first port of the second optical circulator, and the third port of the first optical circulator is optically connected to output via the first and second beam splitters; the second port of the second optical circulator is optically connected to the first port of the first optical wavelength selective filter, the second port of the second optical circulator is optically connected to the third optical interface, and the fourth port of the second optical circulator is optically connected to the second port of the first optical wavelength selective filter; the first beam splitter is arranged to receive light from the third port of the first optical circulator and to transmit light to the second optical interface and to the second beam splitter; and the second beam splitter is arranged to receive light from the first optical interface and from the first beam splitter and to transmit light to the output.

Optionally, the first optical circulator is optically connected to the second optical circulator via a removable connector.

Optionally, the removable connector is an expanded beam connector.

Optionally, the node comprises a third optical circulator and a fourth optical interface arranged to receive a removable second optical wavelength selective filter, the third optical circulator comprising a first port, a second port and a third port, wherein: the first port of the third optical circulator is optically connected to the first optical interface, the second port of the third optical circulator is optically connected to the fourth optical interface, and the third port of the third optical circulator is optically connected to second beam splitter.

Optionally, the fourth optical interface comprises an expanded beam connector.

Optionally, the node comprises the second optical wavelength selective filter, the second optical wavelength selective filter having a same wavelength selectivity substantially matching a wavelength selectivity of the first optical wavelength selective filter.

Optionally, the second optical wavelength selective filter comprises a fibre Bragg grating.

Optionally, one or more of the first, second and third optical interfaces comprises an expanded beam connector.

Optionally, the node comprises an avionics unit, the avionics unit comprising: a light emitter to provide a modulated broadband optical signal to the first optical interface; and a first light detector to receive light from the second optical interface.

Optionally, the avionics unit comprises a second light detector arranged to receive light from the third optical interface.

Optionally, the node comprises a non-reflective termination optically connected to the third optical interface.

Optionally, the first optical wavelength selective filter comprises a fibre Bragg grating.

A second aspect of the present invention provides a node for an optical network, the node comprising: an output to transmit to an optical network a first optical signal comprising a first wavelength component; an input to receive, from the optical network, light comprising plural wavelength components; and an optical interface optically connected to the input and the output, the first optical interface being to receive a removable optical wavelength selective filter arranged to extract the first wavelength component of the plural wavelength components from the light, thereby providing an optical signal comprising the first wavelength component and a second optical signal comprising a remainder of the plural wavelength components.

A third aspect of the present invention provides a system, comprising: a node according to the second aspect of the present invention; and a removable optical wavelength selective filter to optically connect to the optical interface of the node, the optical wavelength selective filter being to extract the first wavelength component of the plural wavelength components from the light.

Optionally, the optical wavelength selective filter is optically connected to the optical interface of the node.

Optionally, the removable optical wavelength selective filter comprises a fibre Bragg grating.

Optionally, the removable optical wavelength selective filter comprises a non-reflective termination.

A fourth aspect of the present invention provides an optical network comprising a node according to the first or second aspect of the present invention, or comprising a system according to the third aspect of the present invention.

Optionally, the optical network comprises a plurality of the nodes in a ring network architecture.

A fifth aspect of the present invention provides an optical network comprising plural nodes, each of the plural nodes being arranged to transmit an optical signal at a distinct wavelength, wherein a node of the plural nodes is arranged to: transmit a first optical signal comprising a first wavelength component; receive light comprising plural wavelength components including the first wavelength component; extract the first wavelength component from the light, thereby providing a second optical signal comprising a remainder of the plural wavelength components; and transmit the second optical signal.

A sixth aspect of the present invention provides a vehicle comprising a node according to the first or second aspect of the present invention, or comprising a system according to the third aspect of the present invention, or comprising an optical network according to the fourth or fifth aspect of the present invention.

Optionally, the vehicle is an aircraft.

A seventh aspect of the present invention provides a method of operating a node according to the first aspect of the present invention, or a system according to the third aspect of the present invention, or an optical network according to the fourth or fifth aspect of the present invention, the method comprising: transmitting an optical signal comprising the first wavelength component from the node; receiving the light comprising plural wavelength components including the first wavelength component at the node; and extracting the first wavelength component from the light at the node, thereby providing the second optical signal comprising the remainder of the plural wavelength components.

BRIEF DESCRIPTION OF THE DRAWINGS

Embodiments of the invention will now be described, by way of example only, with reference to the accompanying drawings, in which.

DETAILED DESCRIPTION

Figure 1:
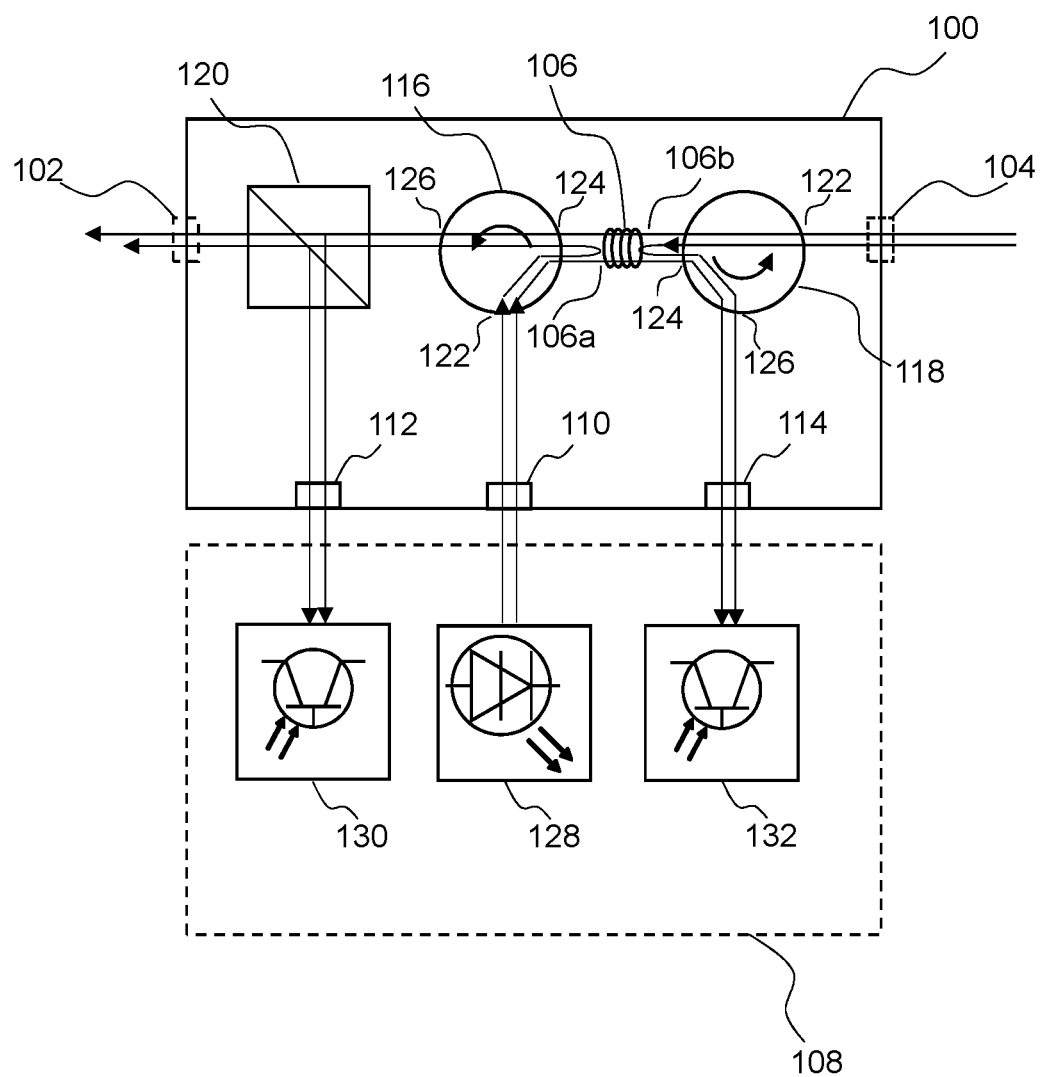
FIG. 1 is a schematic diagram illustrating an example of a node for an optical network of an embodiment of the invention.

FIG. 1 is a schematic diagram illustrating an example of a node 100 for an optical network according to an embodiment of the invention. The node 100 is arranged to transmit an optical signal to and receive optical signals from other nodes in an optical network, such as an optical integrated avionics network. It will be understood that components shown in FIG. 1 are shown symbolically and as such the symbols used do not necessarily reflect the structure of the components they represent.

The node 100 comprises an output 102 and an input 104.

The node 100 is arranged to transmit light via the output 102. The light may comprise a modulated optical signal having a modulation pattern corresponding to data to be transmitted. The modulated optical signal has a wavelength component corresponding with a wavelength assigned to the node 100. For example, the modulated output signal may be visible, infrared, or near-infrared light, ultraviolet, or a combination thereof. In some embodiments, the modulated output signal may have a wavelength range selected to satisfy existing WDM standards, such as Coarse Wavelength Division Multiplexing (CWDM) or Dense Wavelength Division Multiplexing (DWDM). In some embodiments, the modulated output signal may have a wavelength range selected to be compatible with other nodes of the avionics network. For example, each node in the network may be assigned a different wavelength.

The node 100 is arranged to receive, via the input 104, light from the network. The light may comprise plural wavelength components. For example, the plural wavelength components may be wavelengths, or ranges of wavelengths, associated with or assigned to respective different nodes of the network. Each of the wavelength components may thereby comprise an optical signal transmitted by another node of the network.

The node 100 comprises a wavelength selective filter 106. The wavelength selective 106 is optically connected to the input 104. The wavelength selective filter 106 is arranged to extract a wavelength component from the plural wavelength components of the light received via the input 104. The wavelength selective filter 106 is arranged to extract a wavelength component corresponding with the wavelength assigned to the node 100. For example, the wavelength selective filter 106 may reflect a wavelength component corresponding with the wavelength assigned to the node 100.

The wavelength selective filter 106 thereby provides a first optical signal comprising the wavelength component corresponding with the wavelength assigned to the node 100 and a second optical signal comprising a remainder of the plural wavelength components present in the light received via the input 104.

The node 100 is arranged to transmit the second optical signal via the output 102.

In use, the node 100 is optically connected to a unit for transmitting and receiving optical signals, referred to hereinafter by way of example as an avionics unit 108. For example, the node 100 may comprise one or more optical connectors comprising optical interfaces for interfacing with corresponding interfaces of the avionics unit 108.

The wavelength selective filter 106 comprises two ports: an output port 106a and an input port 106b. The output port 106a is optically connected to the output 102 and the input port 106b is optically connected to the input 104.

In the embodiment shown in FIG. 1, the node 100 comprises three optical interfaces for connecting to the avionics unit 108: a transmit interface 110, a receive interface 112, and a monitor interface 114.

The node 100 comprises a first optical circulator 116, a second optical circulator 118, and a beam splitter 120. The first and second optical circulators 116, 118 each comprise a first port 122, a second port 124, and a third port 126. An optical circulator is a non-reciprocal, directional device that may comprise three or more ports for receiving and transmitting light. Light entering an optical circulator in any one of the port exits the optical circulator only from the next port in a sequential manner.

The first port 122 of the first optical circulator 116 is optically connected to the transmit interface 110, the second port 124 of the first optical circulator 116 is optically connected to the output port 106a of the wavelength selective filter 106, and the third port 126 of the first optical circulator 116 is optically connected to the output 102 via the beam splitter 120.

The first port 122 of the second optical circulator 118 is optically connected to the input 104, the second port 124 of the second optical circulator 118 is optically connected to the input port 106b of the wavelength selective filter 106, and the third port 126 of the second optical circulator 118 is optically connected to the monitor interface 114.

The beam splitter 120 is arranged to receive light from the third port 126 of the first optical circulator 116 and transmit light to the output 102 and to the receive interface 112.

The avionics unit 108 comprises a transmitter 128, a receiver 130, and a monitor 132. However, it will be understood that in some embodiments the monitor 132 may be omitted. For example, the monitor 132 may be replaced by a non-reflective termination in the node 100 or in the avionics unit 108.

In use, a first optical signal having a modulation pattern corresponding to data to be transmitted may be transmitted by the transmitter 128. For example, the transmitter 128 may comprise a light emitter (not shown) which emits light having a narrow range of wavelengths corresponding with a wavelength assigned to the node 100. However, in some embodiments, the light emitter of the transmitter 128 may emit light having a broad range of wavelengths components including a wavelength component corresponding with a wavelength assigned to the node 100.

The first optical signal transmitted by the transmitter 128 is received at the first port 122 of the first optical circulator 116 and transmitted from the second port 124 of the first optical circulator 114 to the output port 106a of the wavelength selective filter 106.

The wavelength selective filter 108 is tuned to reflect a narrow range of wavelengths corresponding with the wavelength assigned to the node 100 and to transmit other wavelength components.

The first optical signal is reflected by the wavelength selective filter 106 back to the second port 124 of the first optical circulator 116. The first optical signal is then transmitted from the third port 126 of the first optical circulator 116 to the beam splitter 120.

Wavelength components other than the wavelength component that corresponds with the wavelength assigned to the node 100 are transmitted via the input port 106b of the wavelength selective filter 106 to the second port 124 of the second optical circulator 118. These other wavelength components are transmitted from the third port 126 of the second optical circulator 118 to the monitor interface 114, and are not transmitted to other nodes of the network. In some embodiments, these other wavelength components may be detected by a monitoring detector 132 in the avionics unit 108, so that the avionics unit 108 can perform monitoring functions such as checking that the appropriate wavelength components are not present in the first optical signal, that the data modulated on the optical signal is correct, or that the optical transmitter is performing as expected. In other embodiments, the other wavelength components may be removed without detection by, for example, a non-reflective termination in the node 100 or the avionics unit 108.

The beam splitter 120 splits the first optical signal and directs the split first optical signal to the output 102, via which the first optical signal is transmitted to other nodes in the network, and to the receive interface 112, via which the avionics unit 108 may receive the first optical signal to check that the signal has successfully been transmitted.

Upon completion of transmission of the first optical signal through the network, the first optical signal is received at the input 104. Simultaneously, optical signals having other wavelength components, transmitted by other nodes of the network, may be received at the input 104.

Light received at the input 104 is transmitted to the first port 122 of the second optical circulator 118. The light is then transmitted from the second port 124 of the second optical circulator 118 to the input port 106b of the wavelength selective filter 106.

As explained above, the wavelength selective filter 106 is arranged reflect a narrow range of wavelengths corresponding with the wavelength assigned to the node 100 and to transmit other wavelength components. Therefore, the first optical signal is reflected back to the second port 124 of the second optical circulator 118 and transmitted from the third port 126 of the second optical circulator 118 to the monitor interface 114. In some embodiments, first optical signal may be detected by the monitoring detector 132, so that the avionics unit 108 can check that the first optical signal has successfully been received back at the node 100 and can thereby detect faults in the network. In other embodiments, the first optical signal may be removed without detection by, for example, a non-reflective termination in the node 100 or the avionics unit 108.

Wavelength components present in the light received at the input 104 other than the wavelength component to which the wavelength selective filter 106 is tuned (i.e. other than the wavelength assigned to the node 100) are transmitted from the output port 106a of the wavelength selective filter 106 to the second port 124 of the first optical circulator 116 and then transmitted from the third port 126 of the first optical circulator 116 to the beam splitter 120. Those wavelength components are split by the beam splitter 120 and the split light is directed to the output 102, via which it is transmitted to other nodes in the network, and to the receive interface 112, via which the avionics unit 108 may receive those wavelength components to receive signals from other nodes of the network.

Figure 2:
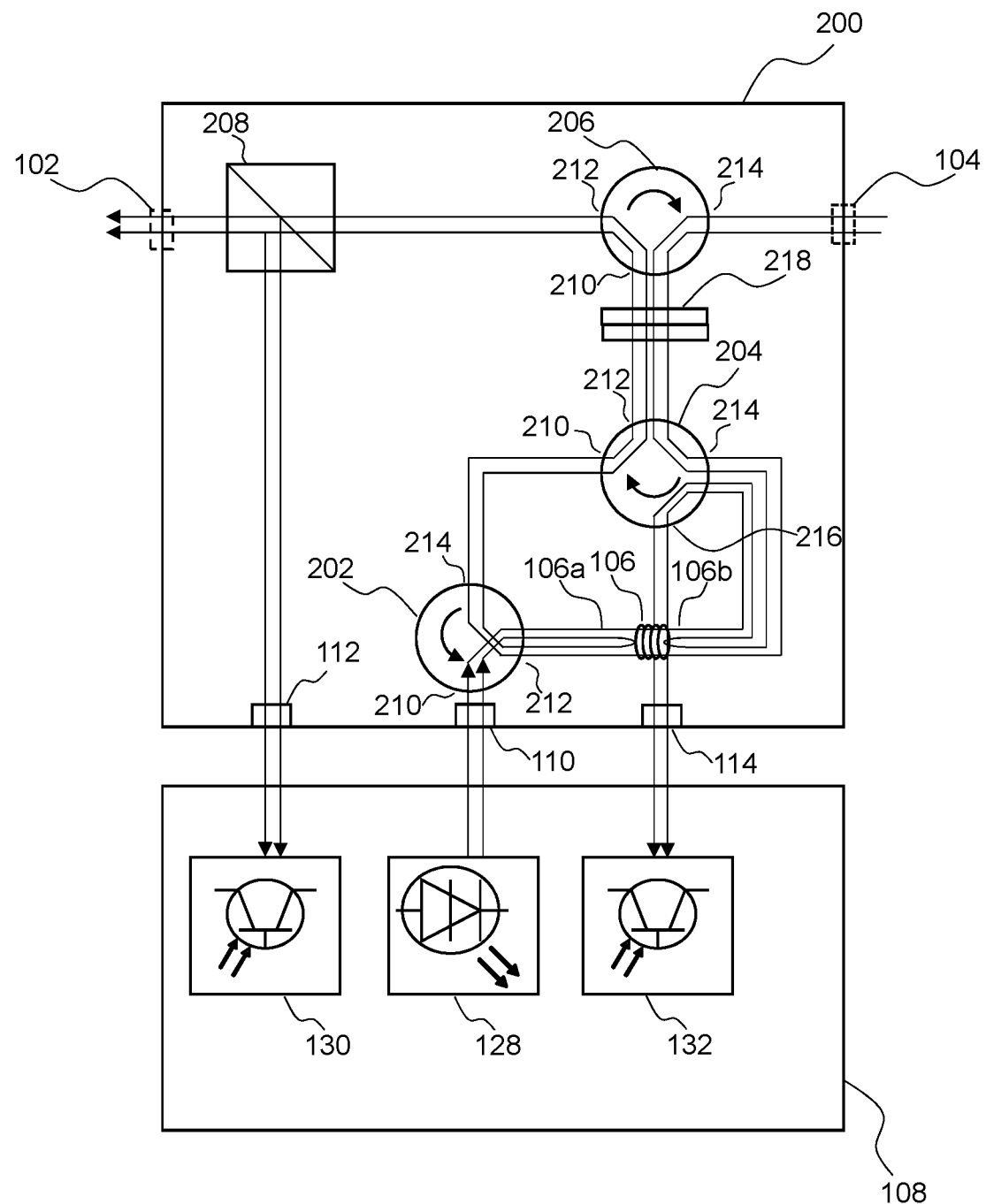
FIG. 2 is a schematic diagram illustrating an example of a node for an optical network of an embodiment of the invention.

FIG. 2 is a schematic diagram illustrating an example of a node 200 for an optical network according to another embodiment of the invention. Similarly to the node 100 shown in FIG. 1, the node 200 shown in FIG. 2 is arranged to transmit an optical signal to, and receive optical signals from, other nodes in an optical network such as an optical integrated avionics network. It will be understood that components shown in FIG. 2 are shown symbolically and as such the symbols used do not necessarily reflect the structure of the components they represent.

Similarly to the node 100 described with reference to FIG. 1, the node 200 shown in FIG. 2 comprises an output 102, an input 104 and a wavelength selective filter 106 comprising an output port 106a and an input port 106b. The node 200 shown in FIG. 2 also comprises three optical interfaces for connecting to an avionics unit 108: a transmit interface 110, a receive interface 112, and a monitor interface 114, similar to the node 100 described with reference to FIG. 1.

The node 200 comprises a first optical circulator 202, a second optical circulator 204, a third optical circulator 206 and a beam splitter 208. The first and third optical circulators 202, 206 each comprise a first port 210, a second port 212, and a third port 214. The second optical circulator 204 comprises a first port 210, a second port 212, a third port 214 and a fourth port 216.

The first port 210 of the first optical circulator 202 is optically connected to the transmit interface 110, the second port 212 of the first optical circulator 202 is optically connected to the output port 106a of the wavelength selective filter 106, and the third port 214 of the first optical circulator 202 is optically connected to the first port 210 of the second optical circulator 204.

The second port 212 of the second optical circulator 204 is optically connected to the first port 210 of the third optical circulator 206, the third port 214 of the second optical circulator 204 is optically connected to the input port 106b of the wavelength selective filter 106, and the fourth port 216 of the second optical circulator 204 is optically connected to the monitor interface 114.

The second port 212 of the third optical circulator 206 is optically connected to the output 102 via the beam splitter 208 and the third port 214 of the third optical circulator 206 is optically connected to the input 104. The beam splitter 208 is arranged to receive light from the second port 212 of the third optical circulator 206 and transmit light to the output 102 and to the receive interface 112.

In use, the node 200 is optically connected to an avionics unit 108 similarly to the node 100 described with reference to FIG. 1. A first optical signal having a modulation pattern corresponding to data to be transmitted may be transmitted by the transmitter 128. The first optical signal transmitted by the transmitter 128 is received at the first port 210 of the first optical circulator 202 and transmitted from the second port 212 of the first optical circulator 202 to the output port 106a of the wavelength selective filter 106.

The first optical signal is reflected by the wavelength selective filter 106 back to the second port 212 of the first optical circulator 202. Similarly to the embodiment described with reference to FIG. 1, wavelength components other than the wavelength component assigned to the node 200 are transmitted via the input port 106b of the wavelength selective filter 106 to the third port 214 of the second optical circulator 204. These other wavelength components are transmitted from the fourth port 216 of the second optical circulator 204 to the monitor interface 114, and are not transmitted to other nodes of the network. In some embodiments, these other wavelength components may be detected by the monitoring detector 132 in the avionics unit 108, so that the avionics unit 108 can check that inappropriate wavelength components are not present in the first optical signal. In other embodiments, the other wavelength components may be removed without detection by, for example, a non-reflective termination.

The reflected first optical signal is transmitted from the third port 214 of the first optical circulator 202 to the first port 210 of the second optical circulator 204. The first optical signal is then transmitted from the second port 212 of the second optical circulator 204 to the first port 210 of the third optical circulator 206 and then transmitted from the second port 212 of the third optical circulator 206 to the output 102 via the beam splitter 208.

The beam splitter 208 splits first optical signal and directs the split first optical signal to the output 102, via which the first optical signal is transmitted to other nodes in the network, and to the receive interface 112, via which the avionics unit 108 may receive the first optical signal to check that the signal has successfully been transmitted.

Upon completion of the transmission through the network, the first optical signal is received at the input 104. Simultaneously, optical signals having other wavelength components transmitted by other nodes of the network may be received at the input 104.

Light received at the input 104 is transmitted to the third port 214 of the third optical circulator 206. The light is then transmitted from the first port 210 of the third optical circulator 206 to the second port 212 of the second optical circulator 204 and from the third port 214 of the second optical circulator 204 to the input port 106b of the wavelength selective filter 106.

The first optical signal is reflected back to the third port 214 of the second optical circulator 204 and transmitted from the fourth port 216 of the second optical circulator 204 to the monitor interface 114. In some embodiments, first optical signal may be detected by the monitoring detector 132 in the avionics unit 108, so that the avionics unit 108 can check that the first optical signal has successfully been received back at the node 100 and can thereby detect faults in the network. In other embodiments, the first optical signal may be removed without detection by, for example, a non-reflective termination in the node 200 or the avionics unit 108.

Wavelength components present in the light received at the input 104 other than the wavelength component to which the wavelength selective filter 106 is tuned (i.e. other than the wavelength assigned to the node 100) are transmitted from the output port 106a of the wavelength selective filter 106 to the second port 212 of the first optical circulator 202, from the third port 214 of the first optical circulator 202 to the first port 210 of the second optical circulator 204, from the second port 212 of the second optical circulator 204 to the first port 210 of the third optical circulator 206, and from the second port 212 of the third optical circulator 206 to the beam splitter 208. Those wavelength components are split by the beam splitter 120 and the split light is directed to the output 102, via which they are transmitted to other nodes in the network, and to the receive interface 112, via which the avionics unit 108 may receive those wavelength components to receive signals from other nodes of the network.

In some embodiments, the node 200 may additionally comprise a removable connector 218 via which the second port 212 of the second optical circulator 204 is optically connected to the first port 210 of the third optical circulator 206. For example, the removable connector 218 may comprise an expanded beam connector. The removable connector 218 enables a portion of the node 200 comprising the wavelength selective filter 106 to be removable and replaceable. This in turn enables the wavelength at which the node 200 is tuned to be changed. For example, the wavelength selective filter 106 can be replaced with a wavelength selective filter tuned to a different wavelength to match the wavelength of the first optical signal.

Figure 3:
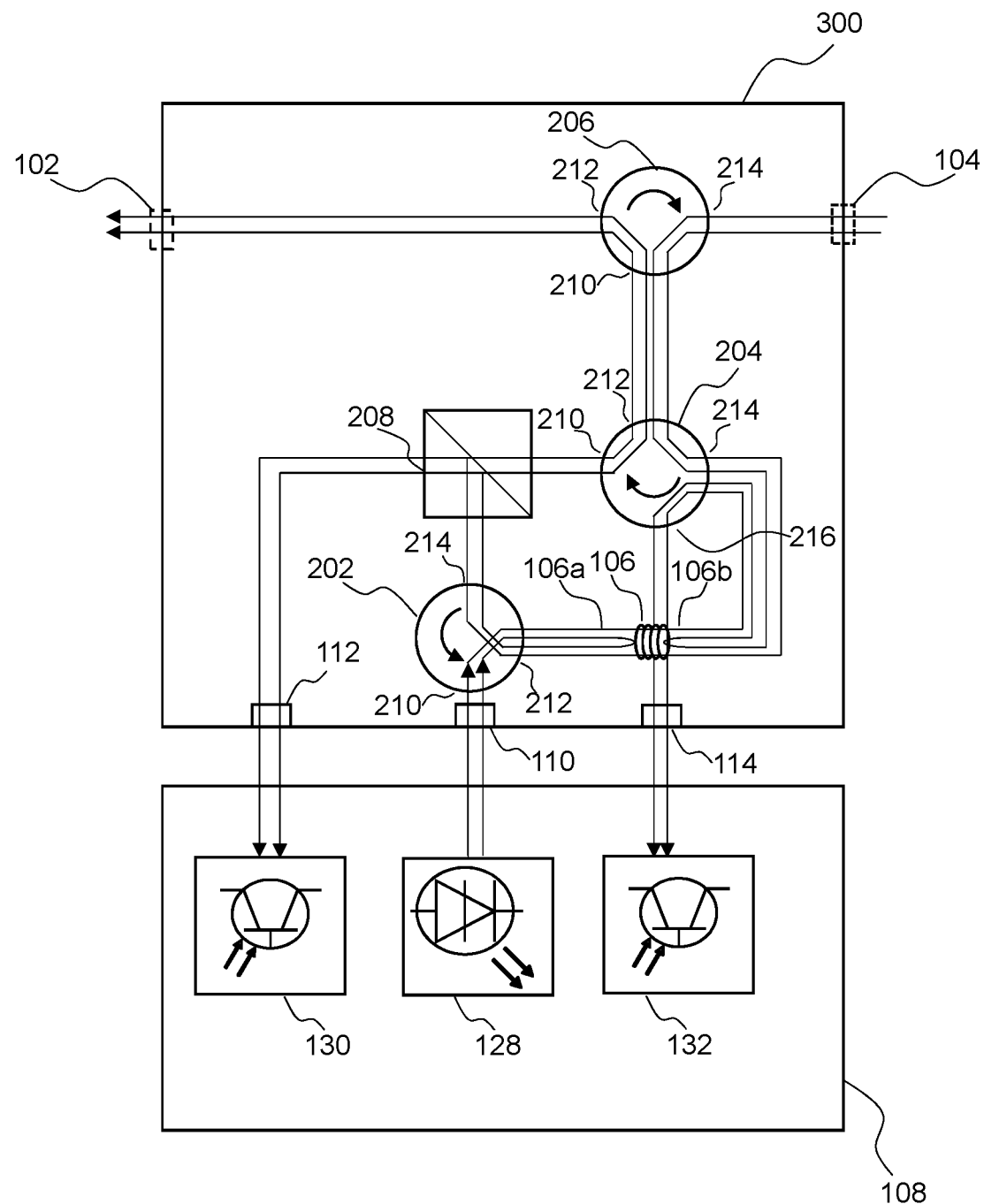
FIG. 3 is a schematic diagram illustrating an example of a node for an optical network of an embodiment of the invention.

FIG. 3 is a schematic diagram illustrating an example of a node 300 for an optical network according to another embodiment of the invention. Similarly to the node 100 shown in FIG. 1 and the node 200 shown in FIG. 2, the node 300 is arranged to transmit an optical signal to, and receive optical signals from, other nodes in an optical network such as an optical integrated avionics network. It will be understood that components shown in FIG. 3 are shown symbolically and as such the symbols used do not necessarily reflect the structure of the components they represent.

Similarly to the node 200 described with reference to FIG. 2, the node 300 shown in FIG. 3 comprises an output 102, an input 104 and a wavelength selective filter 106 comprising an output port 106a and an input port 106b. The node 300 shown in FIG. 3 also comprises three optical interfaces for connecting to the avionics unit 108: a transmit interface 110, a receive interface 112, and a monitor interface 114, similar to the node 100 described with reference to FIG. 1. Similarly to the node 200 shown in FIG. 2, the node 300 also comprises a first optical circulator 202, a second optical circulator 204, a third optical circulator 206 and a beam splitter 208. The first and third optical circulators 202, 206 each comprise a first port 210, a second port 212, and a third port 214. The second optical circulator 204 comprises a first port 210, a second port 212, a third port 214 and a fourth port 216.

The first port 210 of the first optical circulator 202 is optically connected to the transmit interface 110, the second port 212 of the first optical circulator 202 is optically connected to the output port 106a of the wavelength selective filter 106, and the third port 214 of the first optical circulator 202 is optically connected to the first port 210 of the second optical circulator 204. However, in the embodiment shown in FIG. 3, the third port 214 of the first optical circulator 202 is optically connected to the first port 210 of the second optical circulator 204 via the beam splitter 208. The beam splitter 208 is split light receive from the third port 214 of the first optical circulator 202 and direct the split light to the first port 210 of the second optical circulator 204 and to the receive interface 112.

Similarly to the node 200 of FIG. 2, in the node 300 of this embodiment, the second port 212 of the second optical circulator 204 is optically connected to the first port 210 of the third optical circulator 206, the third port 214 of the second optical circulator 204 is optically connected to the input port 106b of the wavelength selective filter 106, and the fourth port 216 of the second optical circulator 204 is optically connected to the monitor interface 114.

Similarly to the node 200 of FIG. 2, in the node 300 of this embodiment, the second port 212 of the third optical circulator 206 is optically connected to the output 102 and the third port 214 of the third optical circulator 206 is optically connected to the input 104.

In use, the node 200 is optically connected to an avionics unit 108 similarly to the node 100 described with reference to FIG. 1. A first optical signal having a modulation pattern corresponding to data to be transmitted may be transmitted by the transmitter 128. The first optical signal transmitted by the transmitter 128 is received at the first port 210 of the first optical circulator 202 and transmitted from the second port 212 of the first optical circulator 202 to the output port 106a of the wavelength selective filter 106.

The first optical signal is reflected by the wavelength selective filter 106 back to the second port 212 of the first optical circulator 202. Similarly, to the embodiment described with reference to FIG. 1, wavelength components other than the wavelength component assigned to the node 300 are transmitted via the input port 106b of the wavelength selective filter 106 to the third port 214 of the second optical circulator 204. These other wavelength components are transmitted from the fourth port 216 of the second optical circulator 204 to the monitor interface 114, and are not transmitted to other nodes of the network. In some embodiments, these other wavelength components may be detected by the monitoring detector 132 in the avionics unit 108, so that the avionics unit 108 can check that inappropriate wavelength components are not present in the first optical signal. In other embodiments, the other wavelength components may be removed without detection by, for example, a non-reflective termination.

The reflected first optical signal is transmitted from the third port 214 of the first optical circulator 202 to the beam splitter 208. The beam splitter splits the first optical signal and directs the split first optical signal to the receive interface 112, via which the avionics unit 108 may receive those wavelength components to receive signals from other nodes of the network, and to the first port 210 of the second optical circulator 204. The first optical signal is then transmitted from the second port 212 of the second optical circulator 204 to the first port 210 of the third optical circulator 206 and then transmitted from the second port 212 of the third optical circulator 206 to the output 102 to be transmitted to other nodes in the network.

Upon completion of the transmission through the network, the first optical signal is received at the input 104. Simultaneously, optical signals having other wavelength components transmitted by other nodes of the network may be received at the input 104.

Light received at the input 104 is transmitted to the third port 214 of the third optical circulator 206. The light is then transmitted from the first port 210 of the third optical circulator 206 to the second port 212 of the second optical circulator 204 and from the third port 214 of the second optical circulator 204 to the input port 106b of the wavelength selective filter 106.

The first optical signal is reflected back to the third port 214 of the second optical circulator 204 and transmitted from the fourth port 216 of the second optical circulator 204 to the monitor interface 114. In some embodiments, first optical signal may be detected by the monitoring detector 132 in the avionics unit 108, so that the avionics unit 108 can check that the first optical signal has successfully been received back at the node 100 and can thereby detect faults in the network. In other embodiments, the first optical signal may be removed without detection by, for example, a non-reflective termination.

Wavelength components present in the light received at the input 104 other than the wavelength component to which the wavelength selective filter 106 is tuned (i.e. other than the wavelength assigned to the node 100) are transmitted from the output port 106a of the wavelength selective filter 106 to the second port 212 of the first optical circulator 202, and from the third port 214 of the first optical circulator 202 to the beam splitter 208. The beam splitter splits the remaining light and directs the split light to the receive interface 112, via which the avionics unit 108 may receive signals from other nodes, and to the first port 210 of the second optical circulator 204, via which (and via the third optical circulator 206) the remaining light may be transmitted via the output 102 to other nodes of the network.

In this embodiment, there is no removable connector between the second optical circulator 204 and the third optical circulator 206, which provides a more efficient optical connection. However, it will be understood that a removable connector, such as the removable connector 218 described with reference to FIG. 2, could be included.

In each of the nodes 100, 200, 300 described above with reference to FIGS. 1 to 3, optical signals of a wavelength assigned to the node 100, 200, 300 can be emitted by the node 100, 200, 300, transmitted via the network to other nodes, and removed by the node 100, 200, 300 having been transmitted to the other nodes. This prevents signals transmitted by the node 100, 200, 300 from propagating through the network indefinitely. Removal of the signal is done using passive components that do not utilise high complexity configurable resources which are difficult to test (as may be the case where wavelength selective switches are used, for example) and which do not add latency at each node. In the embodiments described with reference to FIGS. 1 to 3, this is achieved using a single wavelength selective filter that tunes the outgoing signal to correspond with a wavelength assigned to the node, and then filters the returning incoming signal. This enables the node to be operated with a generic avionics unit that utilises a broad-band light emitter. Using only a single wavelength selective filter ensures that the node only removes its own wavelength component.

Figure 4:
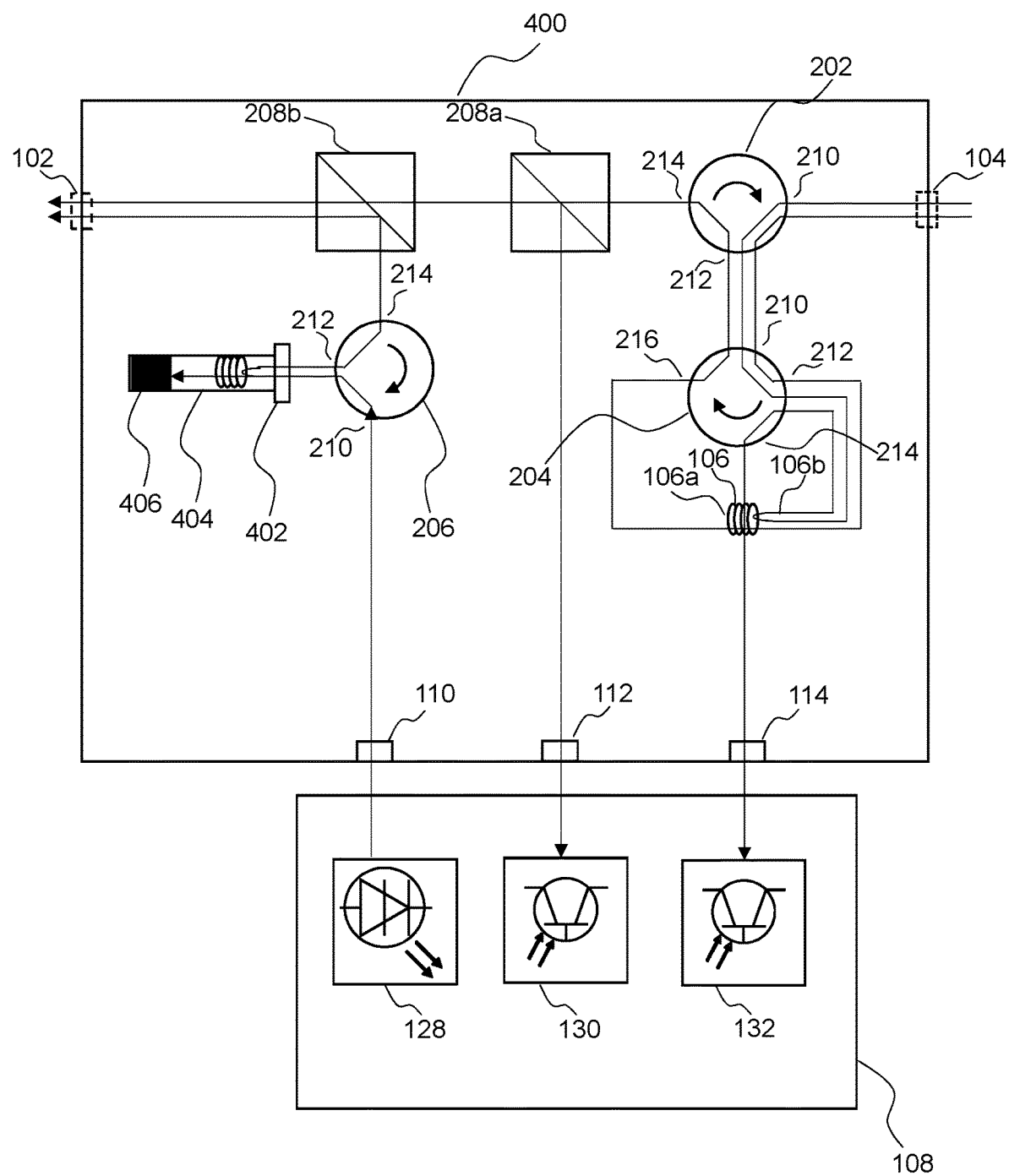
FIG. 4 is a schematic diagram illustrating an example of a node for an optical network of an embodiment of the invention.

FIG. 4 is a schematic diagram illustrating an example of a node 400 for an optical network according to another embodiment of the invention. Similarly to the nodes 100, 200, 300 shown in FIGS. 1, 2 and 3, the node 400 is arranged to transmit an optical signal to, and receive optical signals from, other nodes in an optical network such as an optical integrated avionics network. It will be understood that components shown in FIG. 4 are shown symbolically and as such the symbols used do not necessarily reflect the structure of the components they represent.

Similarly to the node 100 described with reference to FIG. 1, the node 400 shown in FIG. 4 comprises an output 102, an input 104 and a first wavelength selective filter 106 comprising an output port 106a and an input port 106b similar to the wavelength selective filter described above with reference to FIGS. 1 to 3. The node 400 shown in FIG. 4 also comprises three optical interfaces for connecting to the avionics unit 108: a transmit interface 110, a receive interface 112, and a monitor interface 114, similar to the node 100 described with reference to FIG. 1.

The node 400 comprises a first optical circulator 202 and a second optical circulator 204. The first optical circulator 202 comprises a first port 210, a second port 212, and a third port 214. The second optical circulator 204 comprises a first port 210, a second port 212, a third port 214 and a fourth port 216.

The node 400 also comprises a first beam splitter 208a and a second beam splitter 208b.

The first port 210 of the first optical circulator 202 is optically connected to the input 104, the second port 212 of the first optical circulator 202 is optically connected to the first port 210 of the second optical circulator 204, and the third port 214 of the first optical circulator 202 is optically connected to the output 102 via the first and second beam splitters 208a, 208b.

The second port 212 of the second optical circulator 204 is optically connected to the input port 106b of the first wavelength selective filter 106, the third port 214 of the second optical circulator 204 is optically connected to the monitor interface 114, and the fourth port 216 of the second optical circulator 204 is optically connected to the output port 106a of the first wavelength selective filter 106.

The first beam splitter 208a is arranged to receive light from the third port 214 of the first optical circulator 202 and to transmit light to the receive interface 112 and to the second beam splitter 208b.

The second beam splitter 208b, acts as a beam combiner and is arranged to receive light from the transmit interface 110 and from the first beam splitter 208a and to transmit light to the output 102.

In use, the node 400 is optically connected to an avionics unit 108 similarly to the node 100 described with reference to FIG. 1. A first optical signal having a modulation pattern corresponding to data to be transmitted may be transmitted by the transmitter 128. The first optical signal transmitted by the transmitter 128 is received at the second beam splitter 308b and directed to the output 102.

In embodiments in which the avionics unit is capable of providing a single wavelength component itself, the first optical signal may be transmitted directly to the second beam splitter 208b without further filtering. However, in some embodiments, as shown in FIG. 4, the node 400 comprises a third optical circulator 206 and a key interface 402 arranged to receive a second wavelength selective filter 404. The third optical circulator 206 comprises a first port 210, a second port 212 and a third port 214.

The first port 210 of the third optical circulator 206 is optically connected to the transmit interface 110, the second port 212 of the third optical circulator 206 is optically connected to the key interface 402, and the third port 214 of the third optical circulator 206 is optically connected to second beam splitter 208b.

In use, a first optical signal having a modulation pattern corresponding to data to be transmitted may be transmitted by the transmitter 128. For example, the transmitter 128 may comprise a light emitter (not shown) which emits light having a broad range of wavelengths components including a wavelength component corresponding with a wavelength assigned to the node 400. However, in some embodiments, the light emitter of the transmitter 128 may emit light having a narrow range of wavelengths corresponding with a wavelength assigned to the node 400.

The first optical signal transmitted by the transmitter 128 is received at the first port 210 of the third optical circulator 206 and transmitted from the second port 212 of the third optical circulator 206 to the key interface 402.

Light received at the key interface 402 is filtered by the second wavelength selective filter 404. The second wavelength selective filter 404 is tuned to reflect a narrow range of wavelengths corresponding with the wavelength assigned to the node 400 and to transmit other wavelength components.

The first optical signal is reflected by the second wavelength selective filter 404 back to the second port 212 of the third optical circulator 206. The first optical signal is then transmitted from the third port 214 of the third optical circulator 206 to the second beam splitter 208b.

Wavelength components other than the wavelength component that corresponds with the wavelength assigned to the node are transmitted by the second wavelength selective filter 404 and are removed without being transmitted to other nodes of the network. For example, the other wavelength components may be removed by a non-reflective termination 406.

The second beam splitter 208b directs the first optical signal to the output 102, via which the first optical signal is transmitted to other nodes in the network.

Upon completion of the transmission through the network, the first optical signal is received at the input 104. Simultaneously, optical signals having other wavelength components transmitted by other nodes of the network may be received at the input 104.

Light received at the input 104 is transmitted to the first port 210 of the first optical circulator 202. The light is then transmitted from the second port 212 of the first optical circulator 202 to the first port 210 of the second optical circulator 204, and from the second port 212 of the second optical circulator 204 to the input port 106b of the first wavelength selective filter 106. The first optical signal is reflected back to the second port 212 of the second optical circulator 204 and transmitted from the third port 214 of the second optical circulator 204 to the monitor interface 114. In some embodiments, first optical signal may be detected by the monitoring detector 132 in the avionics unit 108, so that the avionics unit 108 can check that the first optical signal has successfully been received back at the node 100 and can thereby detect faults in the network. In other embodiments, the first optical signal may be removed without detection by, for example, a non-reflective termination in the node 200 or the avionics unit 108.

Wavelength components present in the light received at the input 104 other than the wavelength component to which the first wavelength selective filter 106 is tuned (i.e. other than the wavelength assigned to the node 100) are transmitted from the output port 106a of the first wavelength selective filter 106 to the fourth port 216 of the second optical circulator 204. Those wavelength components are transmitted from the first port 210 of the second optical circulator 204 to the second port 212 of the first optical circulator 202, and from the third port 214 of the first optical circulator 202 to the output 102 via the first and second beam splitters 208a, 208b.

The first beam splitter 208a the light comprising only wavelength components other than that of the node 400 and directs the split light to the receive interface 112, via which the avionics unit 108 may receive those wavelength components to receive signals from other nodes of the network and to the output 102 via the second beam splitter 208b, via which the light is transmitted to other nodes in the network.

The nodes 100, 200, 300, 400 described above are able to tune the wavelength of outgoing optical signals and as such it is possible for the networked units that generate the optical signals to utilise broadband light emitters. The use of such emitters allows identical or generic units to be connected to nodes having a wavelength selective filters 106 that are tuned to respective different wavelengths, so that the generic avionics units may be used with optical networks utilising wavelength division multiplexing (WDM).

In critical applications, such as aircraft avionics, each type of avionics unit may have to undergo significant levels of testing before being approved for use. Such testing may involve significant levels of cost. Furthermore, each type of avionics unit needs to be stocked at operating locations where the avionics unit may need to be replaced. Therefore, a generic avionics unit that can be used in optical networks that utilise WDM may reduce the cost of putting avionics units into service. Furthermore, such a generic avionics unit may reduce levels of stock held at operating locations and/or may reduce the time taken to restore an optical network (and a vehicle in which the network operates) to service when maintenance is required.

Figure 5:
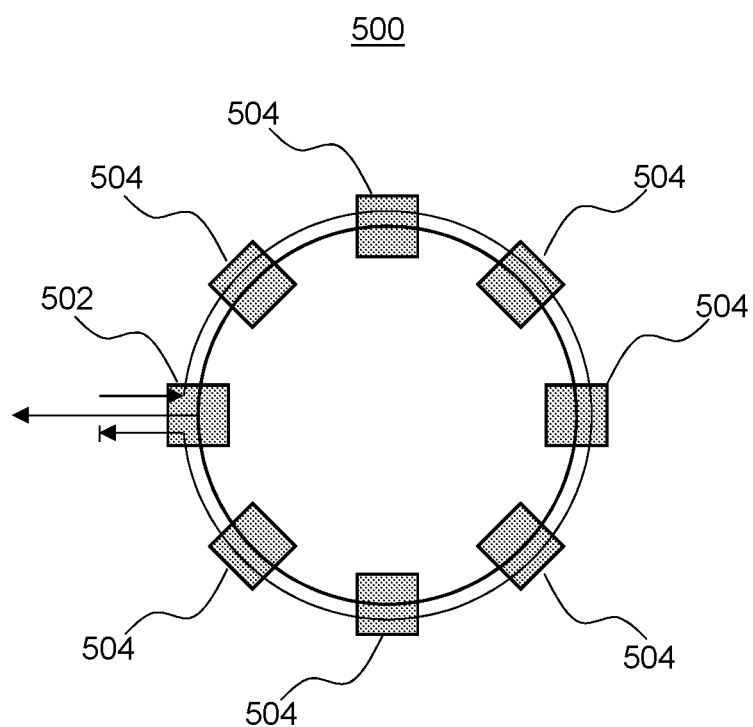
FIG. 5 is a schematic diagram illustrating an example of an optical network of an embodiment of the invention.

FIG. 5 is a schematic diagram illustrating an example of an optical network 500 according to an embodiment of the invention. The optical network 500 comprises a plurality of optical nodes at least one of which corresponds with a node 100, 200, 300, 400 as described above with reference 1 to 4.

In this embodiment, the network 500 is a ring network. However, it will be understood that the invention may be implemented in other network topologies.

The network 500 comprises a plurality of nodes each of which is arranged to transmit an optical signal to other nodes in the network. Each node may, for example, transmit signals having a different wavelength according to a WDM protocol as described above.

In use, a first node 502 transmits a first optical signal comprising a first wavelength component to other nodes in the network 500 in a clockwise direction. Each other node 504 receives and detects the first signal and passively retransmits the first signal to the next node in the network 500. When the first signal arrives back at the first node 502, the first node 502 removes the first signal so that it does not continue to propagate through the network 500.

Unfiltered wavelength components are transmitted by the first node to other nodes in the network 500.

Although in the embodiments described above with reference to FIGS. 1 to 4, the nodes 100, 200, 300, 400 are described as being used to connect avionics units to the network, it will be understood that the nodes may be used to connect other networked apparatus to the network. Furthermore, it will be understood that in some embodiments, the node may be used as a bridge connecting a node in one network to a node in another network.

Figure 6:
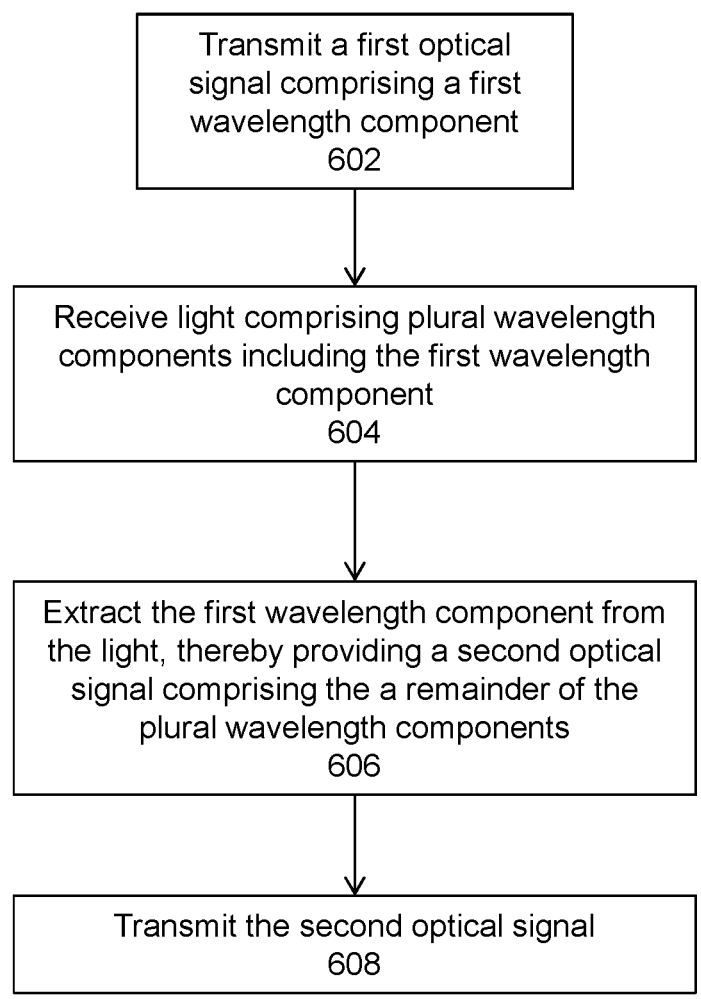
FIG. 6 is a flow diagram illustrating a method of operating an avionics network of an embodiment of the invention.

FIG. 6 is a flow diagram illustrating a method 600 of operating an optical network according to an embodiment of the invention.

At block 602, a first signal is transmitted by a node of the network. The first signal comprises a first wavelength component.

At block 604, light comprising plural wavelength components, including the first wavelength component, is received at the same node.

At block 606, the first wavelength component is extracted from the light, thereby providing a second optical signal comprising the remainder of the plural wavelength components.

At block 608, the second optical signal is transmitted by the node.

In the embodiments described above, the transmit, receive and monitor interfaces 110, 112, 114 may comprise any interface suitable for transmitting optical signals. For example, one or more of the optical interfaces may be optical input-output interfaces. In some embodiments, one or more of the transmit, receive and monitor interfaces 110, 112, 114 may comprise an expanded beam connector.

In the embodiments described above, the receiver 130, where provided, may comprise a detector capable of detecting light. In some embodiments, the detector may be one of a photodiode, a phototransistor, an active pixel sensor, a charge-coupled device or a direct-conversion radiation detector.

It will be understood that, although in some embodiments the wavelength selective filter(s) connected to a node may be part of a wiring harness, in other examples the wavelength selective filter(s) may be separate to the wiring harness. In some embodiments, the wavelength selective filter(s) may be supplied as keys arranged to plug into a corresponding port or optical interface of the node. The nodes may be supplied with or without the wavelength selective filter(s). In some embodiments, a node unit may be supplied with a wavelength selective filter connected to the removable connector.

The wavelength selective filter 106 may be any filter suitable for filtering a relatively narrowband signal from a broadband signal. The wavelength selective filter(s) of embodiments of the invention may be arranged to extract the narrowband optical signal in transmission or in reflection. For example, the wavelength selective filter 106 may comprise one of a fibre Bragg grating, a Long Period Grating, and a Tilted Fibre Bragg grating. Such gratings may, for example, reflect a narrow range of wavelengths and transmit wavelengths outside of the narrow band. In other examples, the wavelength selective filter 106 may comprise a Fabry-Perot interferometer, a fibre interferometer, a diffraction grating, and a prism.

The avionics unit 108 described above may be, for example, a Line Replaceable Unit (LRU) or any other type of avionics unit. The network 500 may be, for example, an Integrated Modular Avionics (IMA) network.

Figure 7:
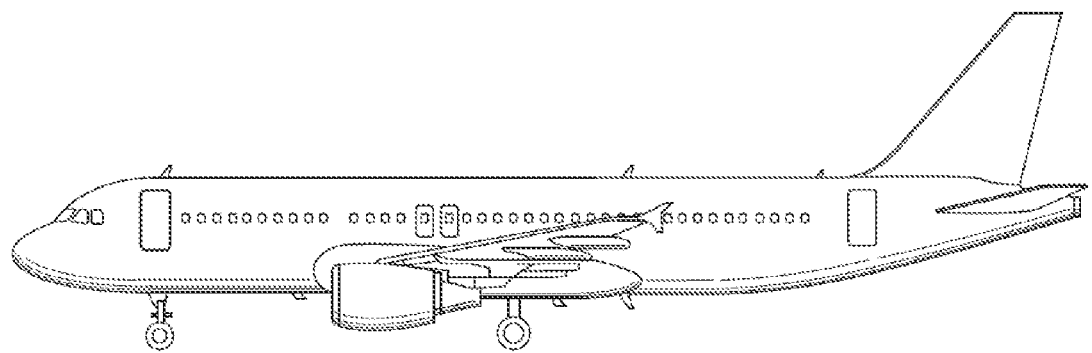
FIG. 7 is a schematic diagram illustrating an example of a vehicle of an embodiment of the invention.

Referring to FIG. 7, there is shown a schematic side view of an example of a vehicle according to an embodiment of the invention. In the example of FIG. 7, the vehicle is an aircraft 700. The aircraft 700 may comprise one or more networks, such as the network 500 described above with reference to FIG. 5. The, or each, network 500 may comprise one or more nodes, such as the nodes 100, 200, 300, 400 described above with reference to FIGS. 1 to 4. In other embodiments, the vehicle may be other than an aircraft, such as a road vehicle, a rail vehicle, a watercraft or a spacecraft.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A node for an optical network comprising:
   an input configured to receive light from an optical network light, wherein the light includes wavelength components;
   first, second and third optical circulators, wherein the third optical circulator is optically connected to the input and to the second optical circulator;
   an optical wavelength selective filter optically connected to the input via the second and third optical circulators, the optical wavelength selective filter is configured to extract from the light received by the input (i) a first wavelength component of the wavelength components to form a first optical signal including the first wavelength component and (ii) a second optical signal including a remainder of the wavelength components;
   a beam splitter optically coupled to the optical wavelength selective filter, via the first, second and third optical circulators, and configured to receive the second optical signal, wherein the beam splitter is configured to split the second optical signal into a first portion and a second portion each of which includes the remainder of the wavelength components;
   a first output optically connected to the optical wavelength selective filter via the beam splitter and the first, second and third optical circulators, and the first output is configured to receive and output the first portion of the second optical signal to a light detector, and
   a second output optically connected to the optical wavelength selective filter via the beam splitter and the first, second and third optical circulators, and the second output is configured to receive and output the second portion of the second optical signal to the optical network.

2. The node of claim 1, wherein the beam splitter is optically directly connected to the third optical circulator and to the first and second outputs.

3. The node of claim 2, wherein the beam splitter is indirectly optically connected to the second circulator via the third optical circulator.

4. The node of claim 3, wherein the beam splitter is indirectly optically connected to the first circulator via the third and second optical circulators.

5. The node of claim 1, wherein the third optical circulator is optically directly connected to the input, the second optical circulator and the beam splitter.

6. The node of claim 1, further comprising one or more optical connectors to connect the node to an avionics unit, the one or more optical connectors comprising:
   a transmit optical interface optically connected to the second output via the beam splitter, and configured to receive an optical signal from the avionics unit; and
   a receive optical interface optically connected to the first output, and configured to transmit the first portion of the second optical signal to the avionics unit.

7. The node of claim 6, wherein the transmit optical interface is directly optically connected to the first circulator.

8. The node of claim 6, wherein the beam splitter is configured to receive the optical signal from the avionics unit via the first, second and third optical circulators.

9. The node of claim 1, wherein the optical wavelength selective filter is removable from the node.

10. The node of claim 1, wherein the optical wavelength selective filter comprises a non-reflective termination.

* * * * *